No. 648,078. Patented Apr. 24, 1900.
J. H. POPE.
STEERING DEVICE FOR AUTOMOBILES.
(Application filed Nov. 4, 1899.)

(No Model.)

WITNESSES:
INVENTOR:
Joseph Horace Pope.
by Alban Andrew
his atty.

UNITED STATES PATENT OFFICE.

JOSEPH HORACE POPE, OF BROCKTON, MASSACHUSETTS.

STEERING DEVICE FOR AUTOMOBILES.

SPECIFICATION forming part of Letters Patent No. 648,078, dated April 24, 1900.

Application filed November 4, 1899. Serial No. 735,795. (No model.)

*To all whom it may concern:*

Be it known that I, JOSEPH HORACE POPE, a citizen of the United States, residing at 254 North Montello street, Brockton, in the county of Plymouth and State of Massachusetts, have invented new and useful Improvements in Steering Devices for Automobiles, of which the following is a specification.

This invention relates to improvements in steering devices for automobiles or similar vehicles, and it is carried out as follows, reference being had to the accompanying drawings, wherein—

Figure 1:
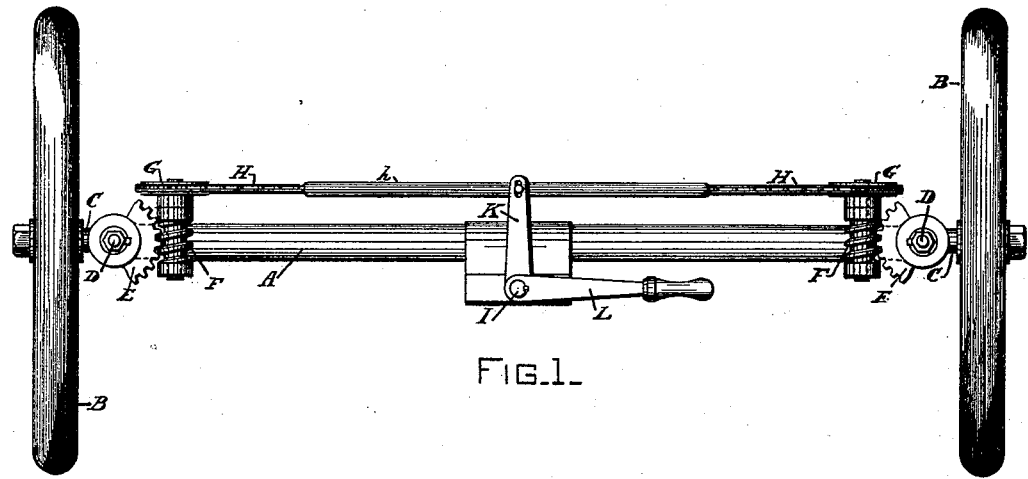
Figure 2:
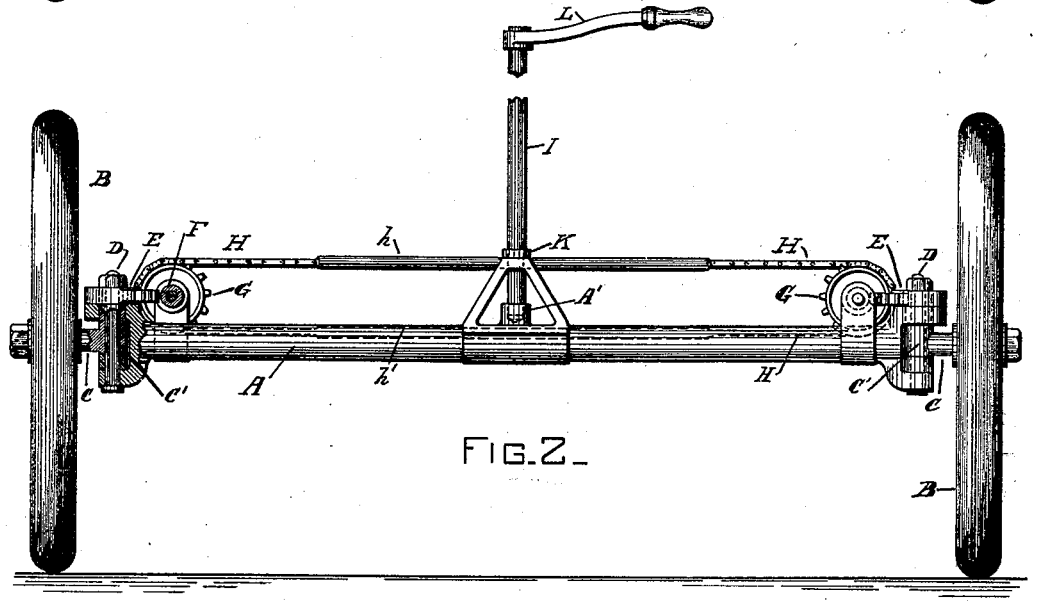

Figure 1 represents a top plan view of the invention; and Fig. 2 represents a front view of the same, partly shown in section.

Similar letters refer to similar parts wherever they occur on the different parts of the drawings.

In the drawings, A represents the axle-hanger, which may be secured to the body of the vehicle in any suitable or well-known manner.

B B are the wheels, journaled on axles C C, preferably made integral with vertical sleeves C' C', pivotally connected to the forked ends of the axle-hanger A by means of bolts D D, as shown. The upper end of each sleeve C' projects through the upper forked portion of the axle-hanger, and to it is suitably secured a segmental gear E, the teeth of which engage with a worm F, suitably journaled in bearings attached to the axle-hanger A, as shown. To one end of said worm or its spindle is attached a sprocket-wheel G, which is connected to the corresponding opposite sprocket-wheel at the other side of the vehicle by means of a sprocket-chain H, preferably provided with midway solid links or portions $h$ $h'$, as shown.

I is the steering-shaft, suitably journaled in its lower end in a bearing A', attached to the axle-hanger A. To such shaft is attached a lever K, the free end of which is pivotally connected to the link or rod $h$, as shown in the drawings.

L is the handle-lever, secured to the upper end of the steering-shaft I, as is common in devices of this kind. It will thus be seen that by swinging or adjusting the position of the handle-lever L a motion is imparted to the chains H H, causing the sprocket-wheels G G and their worms F F to be turned, and by the engagement of the latter with the segmental gears E E, which are attached to the axles C C, the latter and the wheels journaled thereon are caused to be turned more or less in a horizontal plane, according to the direction and curvature in which the vehicle is to be steered and guided.

The device is a very simple, compact, and durable one, and it possesses several advantages over other steering devices for this purpose, among which may be mentioned: The device is very rigid in its construction and obviates vibrations of the wheels and prevents their oscillation when striking obstructions in the road or street. The worms F F, by their engagement with the segmental gears G G, serve as a locking device for holding the wheel-axles in their adjusted positions, thus preventing undue strain and muscular exertion on the part of the person in charge of the vehicle during the operation of steering it.

What I wish to secure by Letters Patent and claim is—

The herein-described steering device for automobiles, consisting in combination, an axle-hanger having pivotally connected to its ends the wheel-axles C, C, segmental gears E, E, rigidly secured to sleeves C', C', forming part of said axles, worms F, F, meshing in the teeth of said segmental gears, sprocket-wheels G, G, secured to said worms, and a sprocket-chain engaging said wheels G, G, and connected to the steering-shaft and its handle-lever, substantially as and for the purpose set forth.

In testimony whereof I have hereunto set my hand in presence of two subscribing witnesses.

JOSEPH HORACE POPE.

Witnesses:
ALBAN ANDRÉN,
HENRY R. PAGE.